US009935846B2

(12) United States Patent
Quintana et al.

(10) Patent No.: US 9,935,846 B2
(45) Date of Patent: Apr. 3, 2018

(54) SYNCHRONIZED DISTRIBUTED NETWORKS WITH FRICTIONLESS APPLICATION INSTALLATION

(71) Applicant: Google Inc., Mountain View, CA (US)

(72) Inventors: Fred Quintana, Palo Alto, CA (US); Austin Robison, Sunnyvale, CA (US); Jason Parks, Austin, TX (US); Griffith Buckley Hazen, San Francisco, CA (US)

(73) Assignee: Google LLC, Mountain View, CA (US)

( * ) Notice: Subject to any disclaimer, the term of this patent is extended or adjusted under 35 U.S.C. 154(b) by 965 days.

(21) Appl. No.: 14/304,844

(22) Filed: Jun. 13, 2014

(65) Prior Publication Data
US 2015/0121233 A1 Apr. 30, 2015

Related U.S. Application Data

(60) Provisional application No. 61/898,408, filed on Oct. 31, 2013.

(51) Int. Cl.
*G06F 15/16* (2006.01)
*G06F 17/00* (2006.01)
(Continued)

(52) U.S. Cl.
CPC .......... *H04L 41/22* (2013.01); *G06F 3/04842* (2013.01); *H04L 67/10* (2013.01);
(Continued)

(58) Field of Classification Search
CPC ............... H04L 67/1059; H04L 67/141; H04L 67/1095; H04L 63/0823; H04L 67/10; H04L 41/22; G06F 8/61; G06F 3/04842
(Continued)

(56) References Cited

U.S. PATENT DOCUMENTS 6,522,649 B1 * 2/2003 Stallkamp ......... H04L 12/40058
370/389
7,529,821 B1 5/2009 Cannon et al.
(Continued)

OTHER PUBLICATIONS

E. A. Lee et al., "Determinism in Event-Triggered Distribution Systems with Time Synchronization", 2007 IEEE International Symposium on Precision Clock Synchronization for Measurement, Control, and Synchronization, Oct. 1, 2007, pp. 56-63.
(Continued)

*Primary Examiner* — Daniel C Murray
*Assistant Examiner* — Kishin G Belani
(74) *Attorney, Agent, or Firm* — McDonnell Boehnen; Hulbert & Berghoff LLP

(57) ABSTRACT

Methods and systems are provided related to synchronized networks. A synchronized network can include a node and additional nodes. The node can receive a packet including information. The node can determine whether the packet is from the synchronized network. After determining that the packet is from the synchronized network, the node can: send the packet to at least one of the additional nodes, determine whether a synchronized network interface (SNI) is on the node and is associated with the packet, where the SNI includes software executable on the node. After determining that the SNI is on the node and is associated with the packet, the node can generate a view of data in the synchronized network by: determining a user interface (UI) layout associated with the SNI, generating the view based on the UI layout and on the information using the SNI, and provide the view.

20 Claims, 11 Drawing Sheets

(51) Int. Cl.
  *H04L 12/28* (2006.01)
  *H04L 12/24* (2006.01)
  *G06F 3/0484* (2013.01)
  *H04L 29/08* (2006.01)
  *G06F 9/445* (2018.01)
  *H04L 29/06* (2006.01)
(52) U.S. Cl.
  CPC ............ *H04L 67/1095* (2013.01); *G06F 8/61* (2013.01); *H04L 63/0823* (2013.01)
(58) Field of Classification Search
  USPC ........................................................ 709/231
  See application file for complete search history.

(56) References Cited

U.S. PATENT DOCUMENTS

| | | | |
|---|---|---|---|
| 8,190,726 B2 | 5/2012 | Han et al. | |
| 8,229,888 B1* | 7/2012 | Roskind | H04N 21/25808 707/611 |
| 8,510,404 B2 | 8/2013 | Carmel et al. | |
| 8,601,468 B1 | 12/2013 | Boodman et al. | |
| 8,839,004 B1 | 9/2014 | Bennett et al. | |
| 2003/0055939 A1 | 3/2003 | Kayashima et al. | |
| 2003/0234808 A1 | 12/2003 | Huang | |
| 2004/0041836 A1* | 3/2004 | Zaner | G06Q 10/10 715/751 |
| 2004/0139180 A1 | 7/2004 | White et al. | |
| 2005/0165888 A1* | 7/2005 | Elliott | G06Q 10/10 709/203 |
| 2005/0240680 A1 | 10/2005 | Costa-Requena et al. | |
| 2006/0168208 A1 | 7/2006 | Nagami | |
| 2007/0101336 A1 | 5/2007 | Moore et al. | |
| 2007/0240145 A1 | 10/2007 | Saroj et al. | |
| 2008/0098113 A1 | 4/2008 | Hansen et al. | |
| 2008/0163202 A1 | 7/2008 | Kembel et al. | |
| 2008/0194249 A1 | 8/2008 | Kim | |
| 2009/0038018 A1 | 2/2009 | Mikami | |
| 2009/0198702 A1 | 8/2009 | Novik et al. | |
| 2009/0307336 A1 | 12/2009 | Hieb | |
| 2011/0023024 A1 | 1/2011 | Masuda | |
| 2011/0029900 A1 | 2/2011 | Ngo et al. | |
| 2011/0145812 A1 | 6/2011 | Kong et al. | |
| 2011/0225256 A1 | 9/2011 | Seigneret et al. | |
| 2012/0054793 A1 | 3/2012 | Kang et al. | |
| 2012/0059916 A1 | 3/2012 | Ohashi | |
| 2012/0096365 A1 | 4/2012 | Wilkinson et al. | |
| 2012/0098659 A1 | 4/2012 | Gomez | |
| 2013/0047165 A1* | 2/2013 | Goetz | G06F 9/5027 718/105 |
| 2013/0067451 A1 | 3/2013 | Hussain et al. | |
| 2013/0232255 A1 | 9/2013 | Fukui et al. | |
| 2013/0332216 A1* | 12/2013 | George | G06Q 10/063114 705/7.15 |
| 2014/0047434 A1 | 2/2014 | Lam et al. | |
| 2014/0096129 A1 | 4/2014 | Kimmet et al. | |
| 2014/0279027 A1 | 9/2014 | Chou | |

OTHER PUBLICATIONS

M. Meier, "Precise Time Synchronization for Wireless Sensor Networks using the Global Positioning System", Jan. 2010, Swiss Federal Institute of Technology, Zurich, CH.
D. Veitch et al., "Robust Synchronization of Software Clocks Across the Internet", Proceedings of the 4th ACM Internet Measurement Conference (IMC), Oct. 25, 2004, pp. 219-232.
F. Quintana et al., U.S. Appl. No. 61/898,408, "Synchronized Distributed Networks with Frictionless Application Installation", filed Oct. 31, 2013.
F. Quintana et al., U.S. Appl. No. 14/304,845, "Synchronized Distributed Networks with Frictionless Application Installation", filed Jun. 13, 2014.

* cited by examiner

SYNCHRONIZED DISTRIBUTED NETWORKS WITH FRICTIONLESS APPLICATION INSTALLATION

CROSS-REFERENCE TO RELATED APPLICATIONS

This application claims priority to U.S. Patent App. No. 61/898,408, entitled "Synchronized Distributed Networks with Frictionless Application Installation", filed Oct. 31, 2013, the contents of which are fully incorporated by reference herein for all purposes.

BACKGROUND

A node, or computer, can be connected to other nodes, or computers, using a computer network. A node may need to make decisions based on data stored locally, or at the node, and stored remotely, or on one or more of the other nodes.

Some applications require timing information about data. Other applications require that some or all of the nodes of the computer network have the same data at (virtually) all times. As such, the computer network may be synchronized to ensure timing and/or other information is kept in lockstep.

SUMMARY

In one aspect, a method is provided. A node of a synchronized network receives a packet. The packet includes information. The node determines whether the packet is received from the synchronized network. After determining that the packet is received from the synchronized network, the node: determines a source node for the packet; determines whether the node is connected to one or more other nodes of the synchronized network, where the one or more other nodes do not include either the node or the source node; and after determining that the node is connected to the one or more other nodes, sends the packet to each of the one or more other nodes.

In another aspect, a method is provided. A node of a synchronized network receives a packet. The packet includes information. The synchronized network includes the node and additional nodes. The node is configured to communicate at least with the synchronized network. The node determines whether the packet is received from the synchronized network. After determining that the packet is received from the synchronized network, the node sends the packet to at least one node of the additional nodes. The node determines whether a synchronized network interface (SNI) is on the node and is associated with the packet. The SNI includes software configured to execute on the node. After determining that the SNI is on the node and is associated with the packet, the node generates a view of data in the synchronized network by at least: determining a user interface (UI) layout associated with the SNI; generating the view of data in the synchronized network based on the UI layout and on the information using the SNI; and providing the view of data in the synchronized network.

In another aspect, a method is provided. A node of a synchronized network receives a triggering input, where the triggering input includes at least one input selected from the group of inputs consisting of: an input related to receiving a packet from the synchronized network, an input related to providing a packet to be sent using the synchronized network, an input to utilize an application of the node, an input from a sensor associated with the node, an input from a user interface associated with the node, an input related to a location associated with the node, and an input related to a status of the node. The node determines an SNI associated with the triggering input. The SNI associated with the triggering input is configured with software for utilizing the synchronized network. The node determines whether software of the SNI associated with the triggering input is uninstalled on the node. After determining that the software of the SNI associated with the triggering input is uninstalled on the node, the node: receives the software of the SNI associated with the triggering input at the node, installs the software of the SNI associated with the triggering input for installation by the node, and executes the software of the SNI associated with the triggering input to utilize the synchronized network.

In another aspect, a node of a synchronized network is provided. The node includes a processor and a computer-readable medium that is configured to store at least program instruction. When the program instructions are executed by the processor, the program instructions cause the node to carry out functions. The functions include: receiving a packet including information; determining whether the packet is received from the synchronized network; and after determining that the packet is received from the synchronized network: determining a source node for the packet; determining whether the node is connected to one or more other nodes of the synchronized network, where the one or more other nodes do not include either the node or the source node; and after determining that the node is connected to the one or more other nodes, sending the packet to each of the one or more other nodes.

In another aspect, a computer-readable medium is provided. The computer-readable medium is configured to store program instructions that, when executed by a processor of a node of a synchronized network, cause the node to carry out functions. The functions include: receiving a packet including information; determining whether the packet is received from the synchronized network; and after determining that the packet is received from the synchronized network: determining a source node for the packet; determining whether the node is connected to one or more other nodes of the synchronized network, where the one or more other nodes do not include either the node or the source node; and after determining that the node is connected to the one or more other nodes, sending the packet to each of the one or more other nodes.

In another aspect, a node of a synchronized network is provided. The node includes: means for receiving a packet including information; means for determining whether the packet is received from the synchronized network; and means for, after determining that the packet is received from the synchronized network: determining a source node for the packet; determining whether the node is connected to one or more other nodes of the synchronized network, where the one or more other nodes do not include either the node or the source node; and after determining that the node is connected to the one or more other nodes, sending the packet to each of the one or more other nodes.

In another aspect, a node configured to communicate with a synchronized network is provided. The synchronized network includes the node and additional nodes. The node includes a processor and a computer-readable medium. The computer-readable medium is configured to store at least program instructions. When the program instructions are executed by the processor, the program instructions cause the node to carry out functions. The functions include: receiving a packet including information, where the node is configured to communicate at least with the synchronized network; determining whether the packet is received from the synchronized network; after determining that the packet is received from the synchronized network: sending the packet to at least one node of the additional nodes; determining whether an SNI is on the node and is associated with the packet, where the SNI comprises software configured to be executed by the processor; and after determining that the SNI is on the node and is associated with the packet, generating a view of data in the synchronized network by at least: determining a UI layout associated with the SNI; generating the view of data based on the UI layout and on the information of the packet using the SNI; and providing the view of data.

In another aspect, a computer-readable medium is provided. The computer-readable medium is configured to store program instructions that, when executed by a processor of a node configured to communicate with a synchronized network, cause the node to carry out functions. The functions include: receiving a packet including information, where the synchronized network comprises the node and additional nodes, and where the node is configured to communicate at least with the synchronized network; determining whether the packet is received from the synchronized network; and after determining that the packet is received from the synchronized network: sending the packet to at least one node of the additional nodes; determining whether an SNI is on the node and is associated with the packet, where the SNI comprises software configured to execute on the node; after determining that the SNI is on the node and is associated with the packet, generating a view of data in the synchronized network by at least: determining a UI layout associated with the SNI; generating the view of data based on the UI layout and on the information of the packet using the SNI; and providing the view of data.

In another aspect, a node of a synchronized network is provided. The node includes: means for receiving a packet including information, where the synchronized network comprises the node and additional nodes, and where the node is configured to communicate at least with the synchronized network; means for determining whether the packet is received from the synchronized network; and means for, after determining that the packet is received from the synchronized network: sending the packet to at least one node of the additional nodes; determining whether an SNI is on the node and is associated with the packet, where the SNI comprises software configured to execute on the node; after determining that the SNI is on the node and is associated with the packet, generating a view of data in the synchronized network by at least: determining a UI layout associated with the SNI; generating the view of data based on the UI layout and on the information of the packet using the SNI; and providing the view of data.

In another aspect, a node of a synchronized network is provided. The node includes: a processor and a computer-readable medium. The computer-readable medium is configured to store at least program instructions that, when the program instructions are executed by the processor, cause the node to carry out functions. The functions include: receiving a triggering input, where the triggering input includes at least one input selected from the group of inputs consisting of: an input related to receiving a packet from the synchronized network, an input related to providing a packet to be sent using the synchronized network, an input to utilize an application of the node, an input from a sensor associated with the node, an input from a user interface associated with the node, an input related to a location associated with the node, and an input related to a status of the node; determining an SNI associated with the triggering input, where the SNI is configured for utilizing the synchronized network; determining whether software of the SNI associated with the triggering input is uninstalled on the node; and after determining that the software of the SNI associated with the triggering input is uninstalled on the node: receiving the software of the SNI associated with the triggering input at the node, installing the software of the SNI associated with the triggering input for execution by the node, and executing the software of the SNI associated with the triggering input using the processor of the node to utilize the synchronized network.

In another aspect, a computer-readable medium is provided. The computer-readable medium is configured to store program instructions that, when executed by a processor of a node, cause a node of a synchronized network to carry out functions. The functions include: receiving a triggering input, where the triggering input includes at least one input selected from the group of inputs consisting of: an input related to receiving a packet from the synchronized network, an input related to providing a packet to be sent using the synchronized network, an input to utilize an application of the node, an input from a sensor associated with the node, an input from a user interface associated with the node, an input related to a location associated with the node, and an input related to a status of the node; determining an SNI associated with the triggering input, where the SNI is configured with software for utilizing the synchronized network; determining whether software of the SNI associated with the triggering input is uninstalled on the node; and after determining that the software of the SNI associated with the triggering input is uninstalled on the node: receiving the software of the SNI associated with the triggering input at the node, installing the software of the SNI associated with the triggering input for execution by the node, and executing the software of the SNI associated with the triggering input using the processor of the node to utilize the synchronized network.

In another aspect, a node of a synchronized network is provided. The node includes: processing means; means for receiving a triggering input, where the triggering input includes at least one input selected from the group of inputs consisting of: an input related to receiving a packet from the synchronized network, an input related to providing a packet to be sent using the synchronized network, an input to utilize an application of the node, an input from a sensor associated with the node, an input from a user interface associated with the node, an input related to a location associated with the node, and an input related to a status of the node; means for determining an SNI associated with the triggering input, where the SNI is configured with software for utilizing the synchronized network; means for determining whether software of the SNI associated with the triggering input is uninstalled on the node; and means for, after determining that the software of the SNI associated with the triggering input is uninstalled on the node: receiving the software of the SNI associated with the triggering input at the node, installing the software of the SNI associated with the triggering input for execution by the node, and executing the software of the SNI associated with the triggering input using the processing means to utilize the synchronized network.

DETAILED DESCRIPTION

Overview

Figure 1:
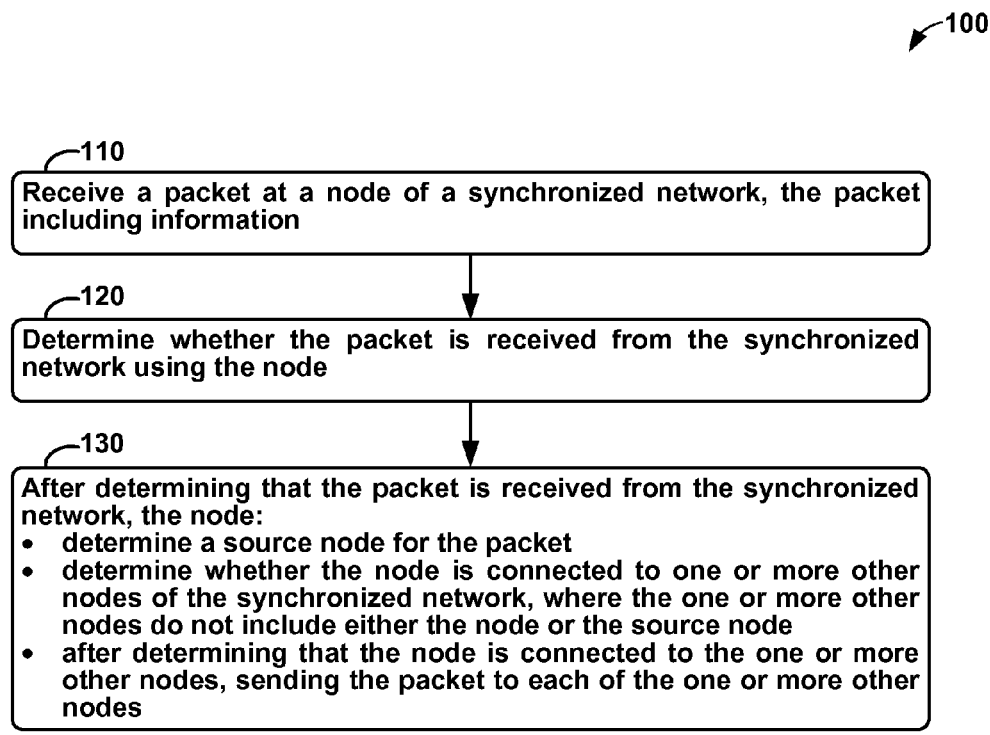
FIG. 1 is a flowchart of a method, in accordance with an example embodiment.

Example embodiments disclosed herein relate to synchronized networks. The herein-described synchronized networks can be, or include, a mesh network consisting of nodes. A node can reside in a computing device at a variety of places, including smartphones, browsers, wearable computing devices, cars, network clouds, TVs, homes, etc. Data in the synchronized network can be transmitted in one or more packets of data using one or more data protocols.

A choice of protocol(s) used by nodes for synchronized network communication can dependent on the connectivity capabilities of the node. For example, a node can have a common persistent connection that can be used to communicate with other nodes in the synchronous network. As another example, a node with a Bluetooth connection to the synchronized network can have data pushed to the node without needing to use an external service.

A node in the synchronized network can be configured to be responsible for synchronizing data with one or more connected nodes. Data can be considered to be synchronized between two nodes when the data has been successfully received by both nodes.

Data can be broadcast, or sent to many nodes, and/or sent to a specific node in the synchronized network. Data intended to be synchronized is likely to be broadcast by a node. Data can be sent node-to-node often to send data to a specific node on the synchronized network without intending to synchronize the sent data; e.g., the data is in a message sent to a specific device for that device alone.

In some cases, the synchronized network can be hierarchical, with a network hierarchy having a root node at the top of the network and terminal nodes at the bottom of the synchronized network. In other cases, the synchronized network can be a flat network, where each node is connected to one or more other nodes in the synchronized network without any network hierarchy placed upon the nodes.

A node can send data that has been received at a node from another node in the synchronized network or has been originated by the node. If this data is to be shared with the synchronous network, the node can put the data into a packet, or perhaps reuse an incoming packet that contains the data, and send the packet to all nodes in the synchronous network connected to the node.

Packets in the synchronized network can be associated with a "software network interface" (SNI) that includes software configured to process the packets. The SNI can be configured to read data from one or more packets and display some or all of this data using one or more user interface (UI) layouts or associated display templates. The SNI can also, or instead, be configured to generate one or more packets for transmission on the synchronized network or, perhaps, some other network.

For example, suppose a synchronized network includes three nodes: a node for a wearable device WD, a node for a television control TC, and a node for a refrigerator R. Packets in the synchronized network can include packets about television control TC and packets about refrigerator R. Wearable device WD can have an SNI STC for processing packets about television control TC and an SNI SR for processing packets about refrigerator R. SNI STC can include a UI layout that includes user-interface controls corresponding to various television controls; e.g., buttons, sliders, and/or keys for changing channels, setting volume, power on, power off. Then, when a user-interface control is utilized; e.g., the user of SNI STC selects a user interface control to turn the power off, SNI STC can update the displayed UI layout and format a packet for the synchronized network related to the utilized control; e.g., STC can format a packet to request that television control TC power off.

Later, if refrigerator R detects that a door is ajar, refrigerator R can generate a packet P2 and send the packet on the synchronized network. Upon reception of packet P2 at wearable device WD, SNI SR can process packet P2 and use a related UI layout to generate a suitable display on wearable device WD; e.g., "Your refrigerator door is open!" In some embodiments, packets not utilized by a device can be ignored and/or discarded; e.g., television control can discard layout packet P2 upon reception.

In some scenarios, a device can be connected to multiple, independent synchronous networks. For example, a person can have a smartphone SP that is connected to a synchronous network NH for home devices and a synchronous network NW for work devices. Data from one synchronous network need not be shared with other networks, even if both networks have common node(s); e.g., devices in network NH may not be synchronized with devices in network NW and vice versa, even though SP acts as a node in both synchronous networks NH and NW.

In some cases, a root node and/or other nodes can maintain data about the synchronized network. For example, the root node or other node(s) can maintain data including, but not limited to data about: SNIs provided to a specific user, locations of available SNIs for downloading, associations between packets and SNIs, packet identification information, information about software applications associated with SNIs, network addresses/protocol information about some or all nodes in the synchronous network. Some or all of the data about the synchronous network can itself be synchronized; e.g., locations of available SNIs, while other data may not be synchronized; e.g., SNIs provided to a specific user.

The synchronized network can be grown incrementally. For example, a small synchronized network can have two nodes, such as a wearable device; e.g., a watch or headmounted device, and a related device; e.g., a smartphone. Then, additional nodes can be added to the synchronized network. For example, a household synchronized network can connect home computers, smart appliances, computerized temperature controls, and/or home electronics. In some networks, a common root node, perhaps implemented as part or all of a network cloud, can maintain data about multiple networks to maintain and/or ensure operational consistency for each synchronous network. For example, the common root node can ensure SNIs are kept up to date, make new SNIs available to nodes in the networks, and maintain associations between SNIs, UI layouts, and packets. Such a common root node can reduce per-network maintenance overhead; i.e., each network need not be separately maintained, but can be maintained via the common root node.

The herein-described synchronized network can make data from a variety of sources ubiquitous throughout the network and then present the ubiquitous data using a single device. For example, a wearable device or smartphone connected to a home synchronized network can use a presentation platform to generate a display of present data about various events registered by nodes in the network; e.g., a meeting reminder or notification of voicemail from a home computer, a warning that a car is low on oil from a node in a vehicle, a notification that the low-oil warning has been processed and an appointment for an oil change has been made, data from a data provider stating an upcoming flight has been delayed. Reception and presentation of such ubiquitous data permits users of the synchronized network to use any connected device to generate a view of information throughout the network.

Example Operations

FIG. 1 is a flowchart of method 100, in accordance with an example embodiment. Method 100 can be executed by a computing device configured as a node in a synchronized network, such as node 400 discussed below at least in the context of FIGS. 4-9. The computing device can be a computing device such as computing device 1100 discussed below at least in the context of FIGS. 11A and 11B.

Method 100 can begin at block 110, where a node of a synchronized network can receive a packet. The packet can include information.

At block 120, the node can determine whether the packet is received from the synchronized network.

At block 130, after determining that the packet is received from the synchronized network, the node can determine a source node for the packet. The node can determine whether the node is connected to one or more other nodes of the synchronized network, where the one or more other nodes do not include either the node or the source node. And the node can, after determining that the node is connected to the one or more other nodes, send the packet to each of the one or more other nodes.

In some embodiments, method 100 further includes: generating a second packet at the node of the synchronized network, the second packet including second information and sending the second packet to each of the one or more other nodes and to the source node.

Figure 2:
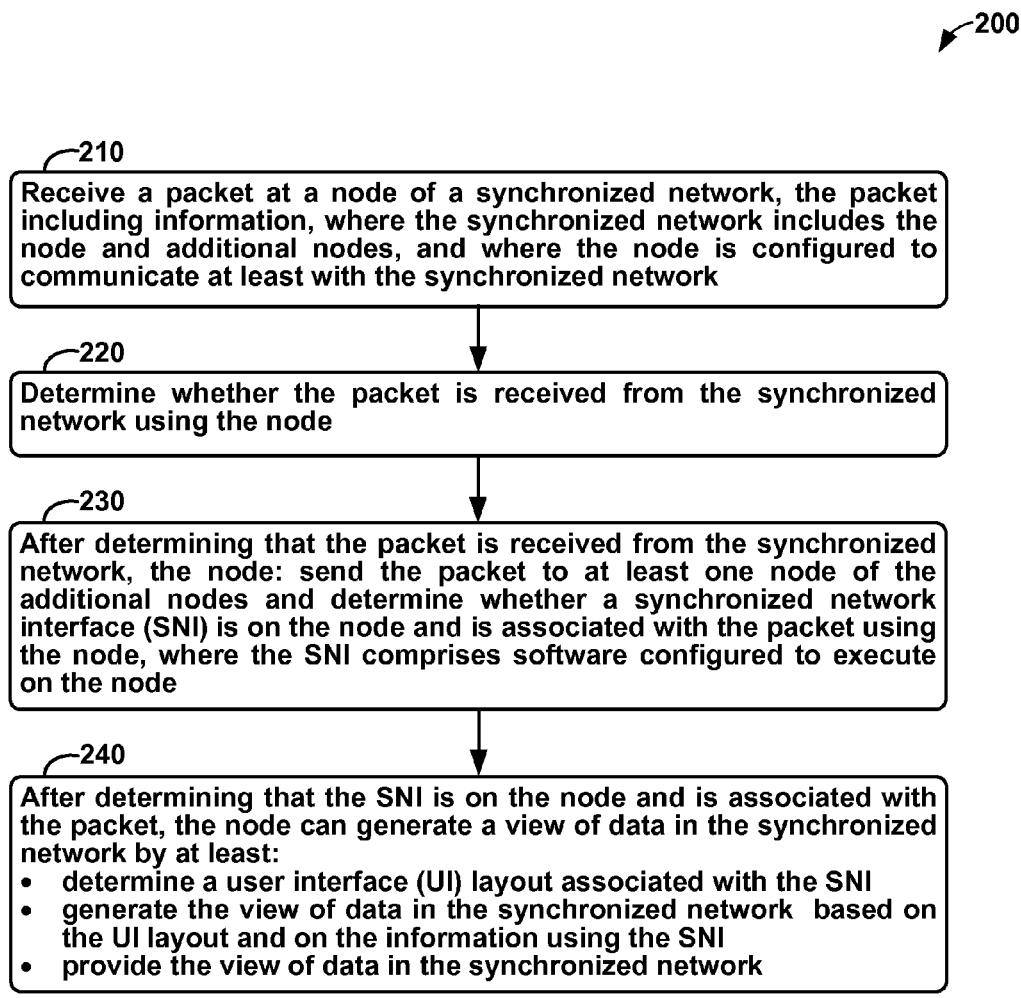
FIG. 2 is a flowchart of another method, in accordance with an example embodiment.

FIG. 2 is a flowchart of method 200, in accordance with an example embodiment. Method 200 can be executed by a computing device configured as a node in a synchronized network, such as node 400 discussed below at least in the context of FIGS. 4-9. The computing device can be a computing device such as computing device 1100 discussed below at least in the context of FIGS. 11A and 11B.

Method 200 can begin at block 210, where a node of a synchronized network can receive a packet. The packet can include information. The synchronized network can include the node and additional nodes. The node can be configured to communicate at least with the synchronized network.

At block 220, the node can determine whether the packet is received from the synchronized network.

At block 230, the node can, after determining that the packet is received from the synchronized network, send the packet to at least one node of the additional nodes. Also, the node can determine whether a SNI is on the node and is associated with the packet. The SNI can include software configured to execute on the node.

In some embodiments, the node can be configured to communicate with each of the additional nodes. Then, sending the packet to the at least one node of the additional nodes can include: determining a source node for the packet; determining whether the node is connected to one or more other nodes of the additional nodes, wherein the one or more other nodes do not include the source node; and after determining that the node is connected to the one or more other nodes, sending the packet to each of the one or more other nodes.

In other embodiments, the node is configured with a plurality of SNIs. Then, determining whether the SNI is installed on the node and is associated with the packet can include selecting the SNI from the plurality of SNIs based on the information in the packet.

In even other embodiments, determining whether the SNI is installed on the node and is associated with the packet can include: receiving an input related to an application configured to execute on the node; referring to the SNI during execution of the application to process the packet, where the application is distinct from the SNI; and executing the SNI to process the packet.

In still other embodiments, the SNI can be associated with a plurality of UI layouts. Then, determining the UI layout associated with the SNI can include receiving an input from a user interface for the SNI; and selecting the UI layout from the plurality of UI layouts based on the input from the user interface.

At block 240, after determining that the SNI is on the node and is associated with the packet, the node can generate a view of data in the synchronized network by at least: determining a UI layout associated with the SNI, generate the view of data in the synchronized network based on the UI layout and on the information using the SNI, and provide the view of data in the synchronized network.

In some embodiments, the SNI can be associated with a plurality of UI layouts. Then, determining the UI layout associated with the SNI can include selecting the UI layout from the plurality of UI layouts based on the information in the packet.

In other embodiments, the additional nodes can include a second node that differs from the node. Then, the SNI can be configured to send a node-to-node message to the second node via the synchronized network.

In even other embodiments, method 200 can further include: generating a second packet at the node, the second packet including second information; and sending the second packet to each node of the additional nodes.

Figure 3:
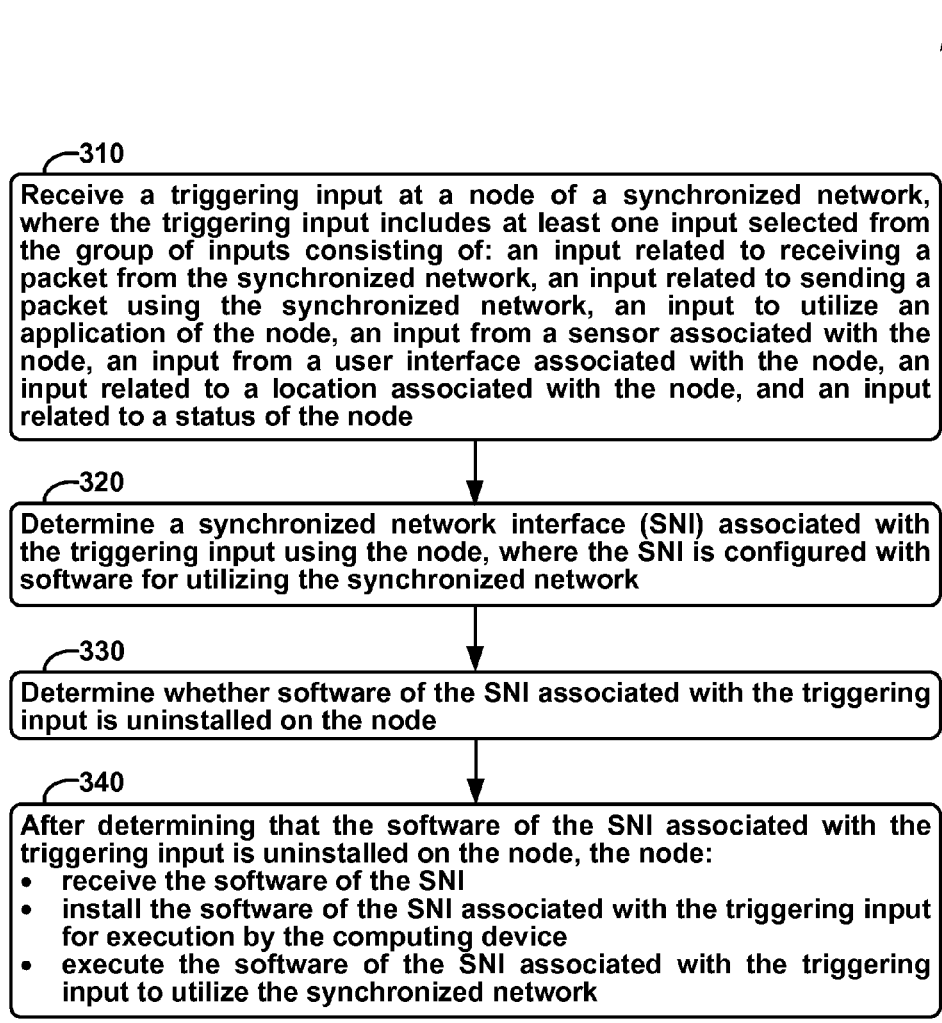
FIG. 3 is a flowchart of yet another method, in accordance with an example embodiment.

FIG. 3 is a flowchart of method 300, in accordance with an example embodiment. Method 300 can be executed by a computing device configured as a node in a synchronized network, such as node 400 discussed below at least in the context of FIGS. 4-9. The computing device can be a computing device such as computing device 1100 discussed below at least in the context of FIGS. 11A and 11B.

Method 300 can begin at block 310, where a node of a synchronized network can receive a triggering input. The triggering input can include at least one input selected from the group of inputs consisting of: an input related to receiving a packet from the synchronized network, an input related to sending a packet using the synchronized network, an input to utilize an application of the node, an input from a sensor associated with the node, an input from a user interface associated with the node, an input related to a location associated with the computing device, and an input related to a status of the node.

At block 320, the node can determine an SNI associated with the triggering input. The SNI can be configured with software for utilizing the synchronized network.

At block 330, the node can determine whether software of the SNI associated with the triggering input is uninstalled on the node.

In some embodiments, determining whether the software of the SNI associated with the triggering input is uninstalled on the node can include: referencing the software of the SNI associated with the triggering input using a network address; and determining whether software associated with the network address is uninstalled on the node. Then, receiving the software of the SNI associated with the triggering input can include obtaining the software of the SNI associated with the triggering input based on the network address.

At block 340, after determining the software of the SNI associated with the triggering input is uninstalled on the node, the node can: receive the software of the SNI associated with the triggering input, install the software of the SNI associated with the triggering input for execution by the computing device, and execute the software of the SNI associated with the triggering input to utilize the synchronized network.

In some embodiments, the triggering input can include the input related to receiving the packet from the synchronized network. The packet can be associated with a designated type of data. A designated SNI can be configured for reception and processing of the designated type of data in the received packet. Then, determining whether the SNI associated with the triggering input is uninstalled on the node comprises determining whether the designated SNI is uninstalled on the node.

In other embodiments, the triggering input can include the input related to providing the packet to be sent using the synchronized network. The packet to be sent can be associated with a designated type of data. A designated SNI can be configured for processing and sending of the designated type of data in the packet to be sent. Then, determining whether the SNI associated with the triggering input is uninstalled on the node can include determining whether the designated SNI is uninstalled on the node.

In yet other embodiments, the triggering input can include the input to utilize an application of the node. A designated SNI can be embedded within the application of the node. Then, determining whether the SNI associated with the triggering input is uninstalled on the node can include determining whether the designated SNI is uninstalled on the node.

In particular of these embodiments, the application of the node can be associated with a software wrapper. Then, installing the SNI associated with the triggering input for execution by the node can include: installing at least the designated SNI; verifying that the application and the designated SNI have been installed for execution by the node; and after verifying that the application and the designated SNI have been installed for execution by the node, removing installation of the application without removing the designated SNI.

In still other embodiments, the triggering input can include the input from a sensor associated with the node. The input from the sensor can include a designated type of data. A designated SNI can be configured for reception and processing of the designated type of data from the sensor. Then, determining whether the SNI associated with the triggering input is uninstalled on the node comprises determining whether the designated SNI is uninstalled on the node.

In even other embodiments, the triggering input can include the input related to a location associated with the node. The location can be associated with a designated SNI. Then, determining whether the SNI associated with the triggering input is uninstalled on the node comprises determining whether the designated SNI is uninstalled on the node.

In further embodiments, the triggering input can include the input from the network other than the synchronized network. The input from the network other than the synchronized network can be associated with a communication with the network other than the synchronized network. A designated SNI can be configured for reception and processing of the communication. Then, determining whether the SNI associated with the triggering input is uninstalled on the node comprises determining whether the designated SNI is uninstalled on the node.

Synchronized Networks

Figure 4:
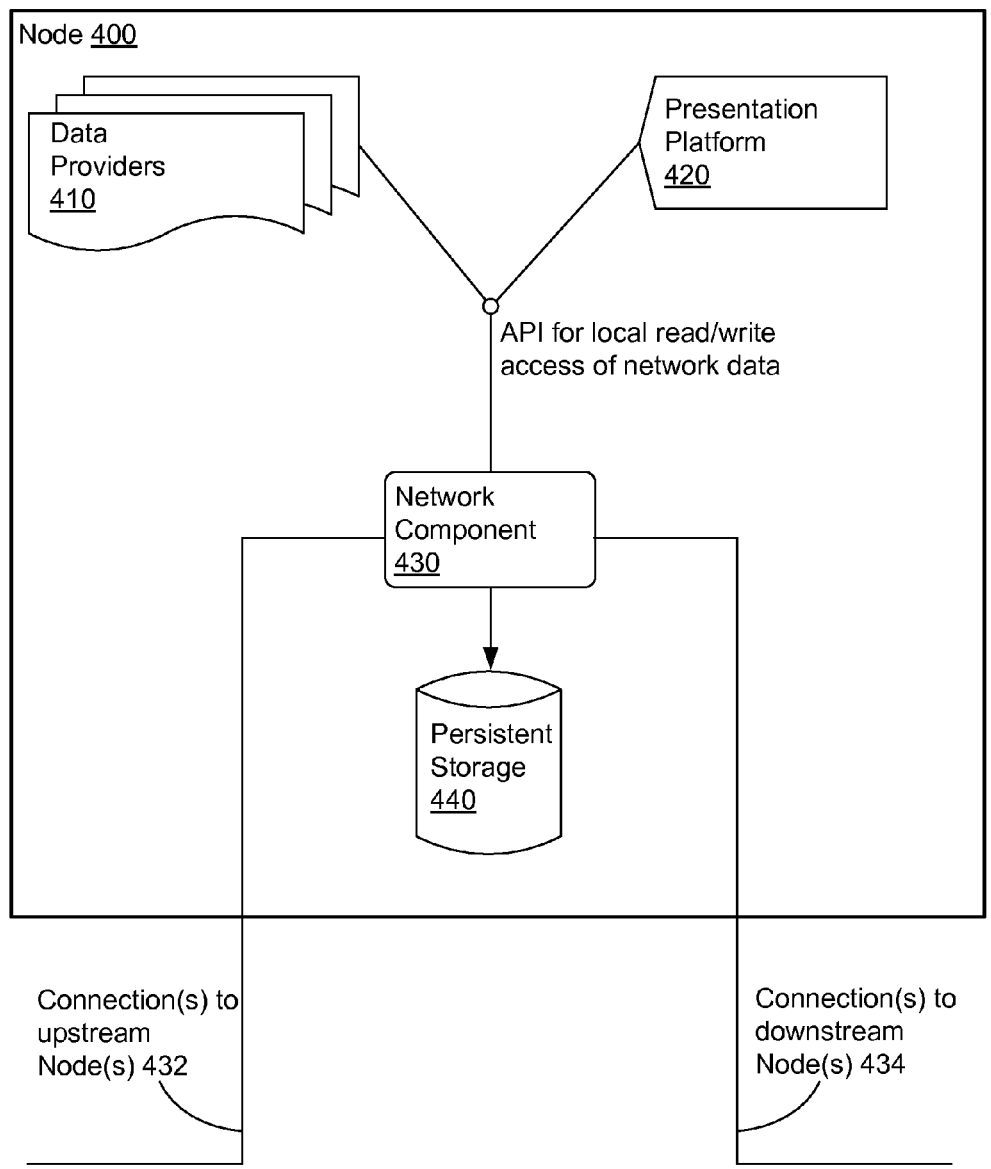
FIG. 4 is a block diagram of an example node of a synchronized network, in accordance with an example embodiment.

FIG. 4 is a block diagram of a node 400 of a synchronized network, in accordance with an example embodiment. The synchronized network can be a network of computing devices, where each computing device is configured to act as a node in the synchronized network, such as node 400. An example computing device is computing device 1100 described below.

Node 400 can include zero or more data providers (DPs) 410, zero or more presentation platforms (PPs) 420, a network component (NC) 430, and persistent storage 440.

Data providers 410 can provide data to node 400. In some embodiments, a data provider can be internal to node 400; e.g., a sensor or other component of node 400, such as sensors 1120 discussed below in the context of FIG. 11A. For example, node 400 can be equipped with a GPS or other location sensor that can provide data about a location of node 400. This data can be placed into a packet and sent to other nodes of the synchronized network.

In other embodiments, a data provider can be external to node 400; e.g., a personal assistant service, a notification manager, a web site, a news or other data feed, and/or a social-networking service. For example, node 400 can be connected to a mail server that can inform node 400 that an electronic mail message has been received. The information about arriving electronic email can be placed into a packet and sent to other nodes of the synchronized network Data providers 410 can be configured to obtain data from node 400 as well; e.g., data from the synchronized network. For example, data from a vehicle connected to the synchronous network can provide data about tire pressure for tires of the vehicle. A data provider for vehicle maintenance DPVM, which can be one of data providers 410 on node 400, can analyze the tire pressure data, determine that the tires should be serviced, and generate a request to schedule service for the vehicle, perhaps after first checking a schedule available via another data provider 410. Then, data provider DPVM can send a packet with the tire pressure data, or another packet regarding requesting authorization to send the service request. Many other internal and external data providers and other types of data are possible as well.

Presentation platform 420 can access data communicated via the synchronized network and/or data provided by data providers 410 and can display, present, and/or otherwise process the accessed data. For example, presentation platform 410 can generate a display of data received via the synchronized network. Presentation platform 420 can change data stored by the node; e.g., data received at node 400 via the synchronized network and/or data stored in persistent storage 440.

Network component 430 can receive data, such as data provided by data providers 410, and synchronize the data with other nodes in the synchronized network. FIG. 4 shows other nodes in the synchronized network connected via connection(s) 432 and 434. Connection(s) 432 include zero or more connections to upstream nodes, or nodes above node 400 in a network hierarchy for the synchronized network. Connection(s) 434 include zero or more connections to downstream nodes, or nodes below node 400 in the network hierarchy. For node 400 to communicate with the remainder of the synchronized network, node 400 has to have at least one connection to the synchronized network. In embodiments without a network hierarchy, connections 432 and 434 can be organized as a set of one or more connections to other nodes in the organized network.

Persistent storage 440 can store some or all data provided by data providers 410, data used by presentation platform 420, data sent/received via the synchronized network, and other data. In some embodiments, node 400 can be configured without persistent storage 440.

Figure 5:
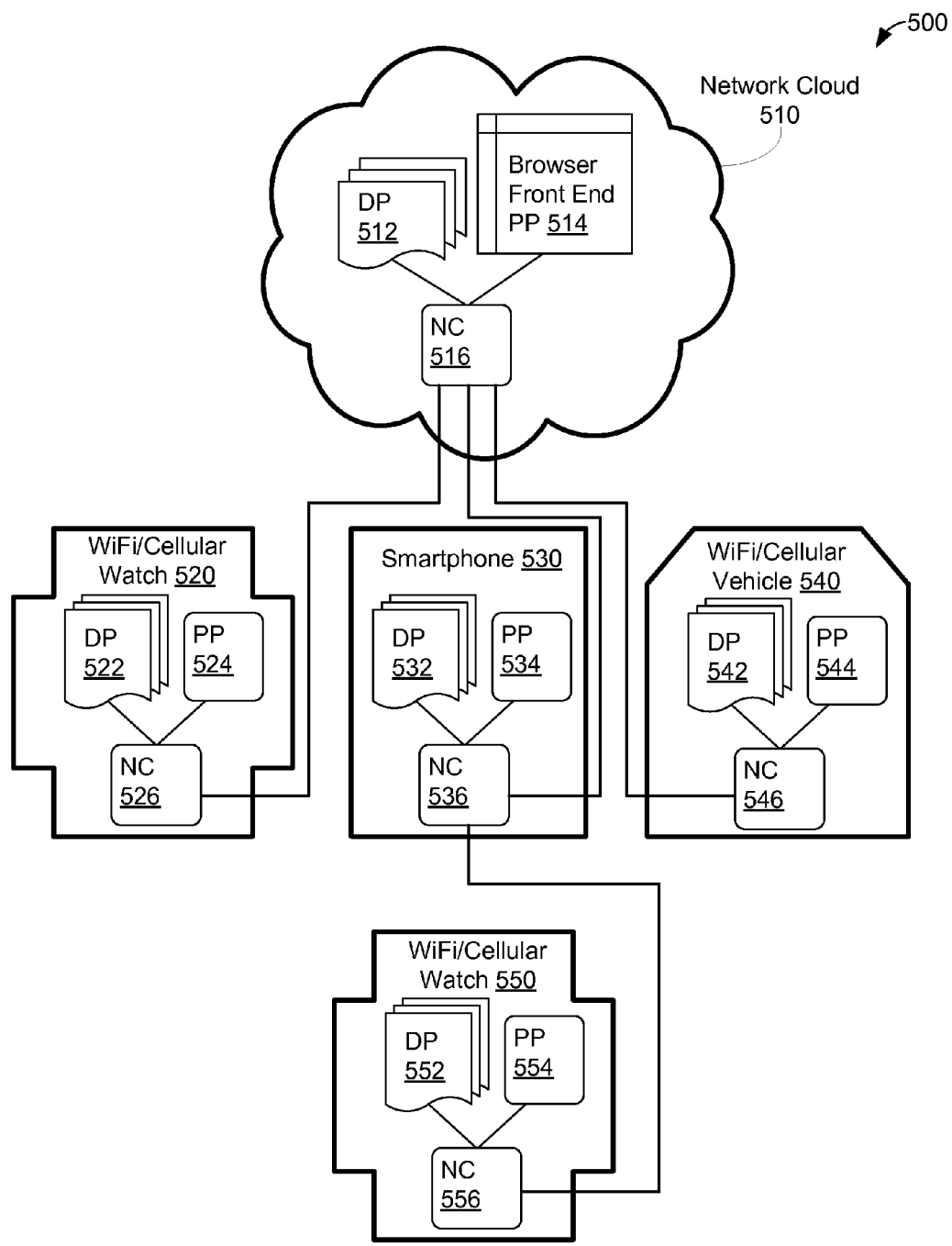
FIG. 5 depicts an example synchronized network, in accordance with an example embodiment.

FIG. 5 depicts synchronized network 500, in accordance with an example embodiment. Synchronized network 500 includes network cloud 510, WiFi/Cellular watches 520 and 550, smartphone 530, WiFi/Cellular vehicle 540, with network cloud 510 being directly connected to WiFi/Cellular watch 520, smartphone 530, and WiFi/Cellular vehicle 540, and smartphone 530 and WiFi/Cellular watch 550 being directly connected.

Each of network cloud 510, WiFi/Cellular watches 520 and 550, smartphone 530, WiFi/Cellular vehicle 540 is configured as a node of synchronized network 500. Each node in synchronized network 500 has zero or more data providers, a network component, and a presentation platform; for example, smartphone 530 include zero or more data providers 532, presentation platform 534, and network component 536. Each of the data providers can provide data for transmission on synchronized network 500 using a network component; e.g., data provider 532 of smartphone 530 can receive and/or generate data that can be provided to network component 536 for transmission as one or more packets on synchronized network 500. Data providers and network components are also discussed above in the context of at least FIG. 4.

Network cloud 510 is shown in FIG. 5 with browser front end presentation platform 514, which can format data communicated via synchronized network 500 for display using a web browser or similar user interface. For example, browser front end presentation platform 514, can format data into a web page, data feed, or other data item that can be displayed on a node of synchronized network 500 using a web browser acting as a presentation platform; e.g., presentation platform 534 of smartphone 530 can include a web browser. Then, data provided by network cloud 510 to smartphone 530 can be formatted by browser front end presentation platform 514 for display by the web browser/presentation platform 534.

In some cases, the synchronized network can be hierarchical, with a network hierarchy having a root node at the top of the network and terminal nodes at the bottom of the synchronized network. Each node N in the network hierarchy, other than the root node, has one or more "upstream nodes" or nodes above N in the network hierarchy and can have one or more "downstream nodes" or nodes below N in the network hierarchy. If node N has no nodes below it in the network hierarchy, then node N can be called a terminal node.

For example, in an embodiment where synchronized network 500 is a hierarchical network, network cloud 510 can act as a root node, each of nodes 520, 530, and 540 can be downstream of cloud 510, and node 550 can be downstream of node 530 and act as a terminal node. In other embodiments, synchronized network 500 can be without a network hierarchy. In these embodiments, each node in synchronized network 500 can be treated as equivalent to the other nodes in the network. In other cases, the synchronized network can be a flat network, where each node is connected to one or more other nodes in the synchronized network without a network hierarchy placed upon the nodes.

A node in the synchronized network can be configured to be responsible for synchronizing data with one or more connected nodes. Data can be considered to be synchronized between two nodes when the data has been successfully received by both nodes. For example, suppose node 550 generates data D1 and sends a packet containing D1 to node 530. Once D1 is successfully received at node 530, then D1 has been synchronized between nodes 550 and 530. Then, node 530 can synchronize D1 throughout synchronized network 500 by successfully sending a packet containing D1, or forwarding the received packet containing D1, to nodes 510, 520, and 540. Then D1 will be synchronized: between nodes 510, 520, 530, 540, and 550 upon successful reception of the packet with D1 send by node 530 at each of nodes 510, 520, and 550. In some cases, unsuccessful reception of a packet can be detected by a node, and the node can subsequently request retransmission of the packet.

Data can be broadcast, or sent to many nodes, and/or sent to a specific node in the synchronized network. Data intended to be synchronized is likely to be broadcast by a node, unless the node is only connected to one, or perhaps, two other nodes; e.g., if a node connected to only two other nodes receives a packet from one of the two nodes, it may only forward the packet on to the non-sending node).

Data can be sent node-to-node either to synchronize data or to send data to a specific node on the synchronized network without intending to synchronize the sent data with other nodes in the synchronized network; e.g., a message sent to a specific device for that device alone. For example, suppose an application on WiFi Cellular Watch 550 needs to use data generated by sensors on node(s) that are at/near the same location as WiFi Cellular Watch 550. However, WiFi Cellular Watch 550 does not have a location sensor, but is connected to Smartphone 530 using a short-range connection; e.g., USB cable or Bluetooth connection. Then, since WiFi Cellular Watch 550 and Smartphone 530 are using the short-range connection, WiFi Cellular Watch 550 can assume that Smartphone 530 is nearby and ask for the location data on Smartphone 530. Upon receiving the location data from Smartphone 530, WiFi Cellular Watch 550 can use the Smartphone-location data to obtain a location of the WiFi Cellular Watch.

The location of the WiFi Cellular Watch could be an augmented location of the Smartphone. For example, WiFi Cellular Watch 550 can determine signal strength of the short-range connection. An error range of the location data from Smartphone 530 can be determined based on the signal strength to account for any distance between Smartphone 530 and the WiFi Cellular Watch 550. Other sensors could also help determine the relative positions of the watch and the phone to translate the phone's location into the watch's location when returning the data to the developer; e.g., accelerometers, sensors providing signal strengths of commonly-connected networks such as a WiFi network, cameras, and/or microphones. Then, WiFi Cellular Watch 550 can send a packet via distributed network to query for other nodes that are in (or near) the same location as smartphone 530.

As another example, suppose WiFi Cellular Watch 550 and Smartphone 530 are in close proximity and that both WiFi Cellular Watch 550 and Smartphone 530 have GPS sensors. Further, suppose WiFi Cellular Watch 550 and Smartphone 530 are paired via Bluetooth. Then, GPS ephemeris data can be transferred to WiFi Cellular Watch 550 from Smartphone 530 (or vice versa) when a location of WiFi Cellular Watch 550 (or a location of Smartphone 530) is requested. By obtaining the GPS ephemeris data from a nearby device rather than from in-range GPS satellite(s), power and time can be saved by reducing communication with the in-range satellites.

A node can send data that has been received at a node from another node in the synchronized network or has been originated by the node. If this data is to be shared with the synchronous network, the node can put the data into a packet, or perhaps reuse an incoming packet that contains the data, and send the packet to all nodes in the synchronous network connected to the node. In some cases, a node N may not send the packet to a node O that originally sent the data to node N via the synchronized network. In some cases, the node N may only report data in the opposite direction as received in the network hierarchy to reduce bandwidth; e.g., data received in a packet from an upstream node may be sent only to downstream nodes and data received in a packet from a downstream node may be sent only to upstream nodes.

In still other cases, a record can be maintained of some or all other nodes that have received a packet, such as a packet P1. Then, when node N receives packet P1 for distribution to connected nodes in the synchronized network, node N can check the record of nodes that have received packet P1. After checking the record, node N may not forward packet P1 on to the nodes that have already received packet P1.

Synchronized network 500 can act as a distributed storage system where synchronized data is available throughout the network. Then, a distributed application can utilize the synchronized data with the assumption that the formatting, logic, and data used by the distributed application is always locally available regardless of how the data was introduced to synchronized network 500.

The synchronized network can be accessed by applications via software of an SNI. The SNI can provide global information and system services, and enable access to SNI specific resources, classes, and packets as well as SNI operations. One example SNI operation is an operation to display a UI layout associated with the SNI, where a UI layout represents a single screen of a user interface for the synchronized network.

An SNI can be specified in terms of SNI configuration data. The SNI configuration data can include an element describing components of the SNI, such as software components such as classes, UI layouts, and/or related data. UI layouts are display elements for use with the synchronized network. The UI layouts can be instantiated by SNIs, and can be used as a navigable user interface for displaying information related to the synchronized network. In some embodiments, making a swiping motion on a touch screen can instruct the user interface to change a visible UI layout being displayed using the touch screen.

UI layouts can exist in different parts of the user interface, but in at most one location within the user interface. Three example user interface locations are stream, task, and home. In the stream location, a stream of the user interface can display a prioritized list of summary UI layouts created by various SNIs. Users can swipe vertically between the summary UI layouts. In some embodiments, each summary UI layout can fill the display. SNIs can select priorities for UI layout ordering, but the UI layouts are ordered and added by the user interface.

The task location is intended for UI layouts related to short-lived tasks; e.g., performing a voice search. While displaying a UI layout associated with task location, UI layouts in other locations, such as the home or stream locations, may not be visible. While in the task location, a swipe gesture can be used to return to a previous task UI layout. If no UI layouts are previous to a current UI layout in the task location, the swipe gesture can instruct the user interface can dismiss the task location. Dismissing the task location can involve removing all task location UI layouts and returning the user interface to the stream location.

The home location is an initial or otherwise fixed UI layout of the user interface. From the home location, additional UI layouts may be visible. The user interface may return to the home location upon reception of a specific gesture; e.g., a particular swiping motion, or upon use of a specific user-interface element; e.g., pressing a home button for the user interface.

The SNI can have a lifecycle during execution that is controllable using a series of embedded function calls, or callback. An SNI can have two states during its lifecycle: a running state and a stopped state. While running, the SNI can execute in the foreground and may display at least one visible UI layout. While stopped, the SNI no longer has any user visible components and is not carrying out any system functions. A stopped SNI can be killed at any time system.

A UI layout has a three state lifecycle—the states for UI layouts can include a resumed state, a paused state, and a stopped state. While resumed, the UI layout is visible on a display. While paused, the UI layout has some user visible component but another component has focus; i.e., is being actively used. While stopped, the UI layout does not have any user visible components on the display.

An operating system of a node, such as node 400, can use an SNI service to enable applications to handle remote actions from associated SNIs. When a network component, such as network component 430, needs to call an application that provides an SNI, the network component can communicate with the application via a call back interface to the application's SNI service. The application can provide interface call back functions that the network component can use to communicate with the SNI.

SNIs can utilize at least two types of data. One type of data is local data, which can be stored on in memory/storage on a node executing the SNI and perhaps only on the node executing the SNI. Another type of data is "synced" or synchronized data, which can be communicated and synchronized on all nodes of the synchronized network.

Figure 6:
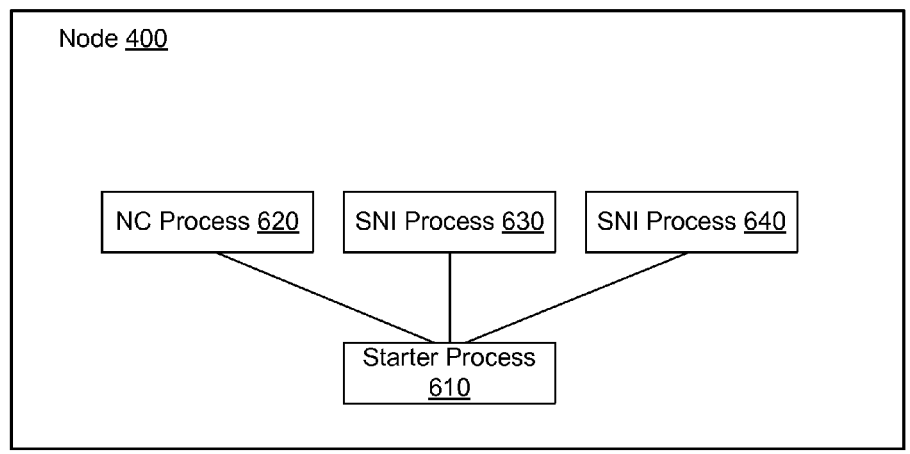
FIG. 6 shows an initial execution of a network component process and two SNI process using a starter process, in accordance with an example embodiment.

FIG. 6 shows example initial execution of network component process 620 and two SNI processes 630 and 640 using starter process 610 on node 400 of a synchronized network, in accordance with an example embodiment. Network component process 620 can perform some or all of the herein-described functionality of a network component; e.g., network component 430.

Starter process 610 can initiate execution of network component process 620, thus enabling node 400 to access and utilize the synchronous network via the network component. Then, as SNIs are invoked to process data from the synchronous network, starter process 610 can fork, or start, the SNIs, such as SNI processes 630 and 640 shown in FIG. 6. In some embodiments, network component process 620 and each SNI process 630, 640 can run as separate processes; e.g., as shown in FIG. 6. In other embodiments, a network component and SNIs can each execute as threads of one or more processes.

Figure 7:
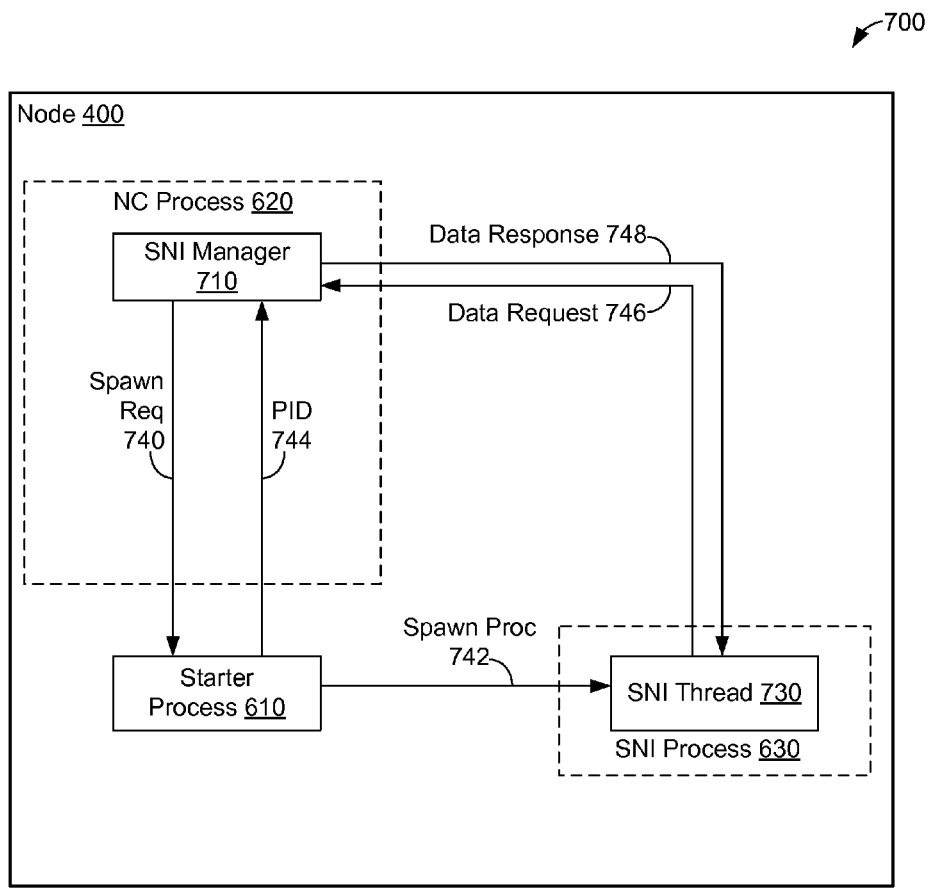
FIG. 7 shows an example scenario for starting an SNI process, in accordance with an example embodiment.

FIG. 7 shows a scenario 700 for starting SNI process 630, in accordance with an example embodiment. Scenario 700 starts with SNI manager 710 of network component process 620 sending a spawn request 740 to starter process 610 to spawn, or create and execute, an SNI process. In scenario 700, SNI manager 710 can manage SNI installation and SNI lifecycle(s) for network component process 620.

Upon reception of spawn request 740, starter process 610 can attempt to spawn SNI process 630. In scenario 700, the attempt to spawn SNI process 630 is successful. Once SNI process 630 is spawned, starter process 610 can obtain process ID PID for SNI process 630 and can send process identifier PID 744 to SNI manager 710. Then, SNI manager 710 can use the process ID to address internal messages to SNI process 630.

Scenario 700 can continue with SNI thread 730 executing as part of SNI process 630. SNI thread 730 can send data request 746 to SNI manager 710 to obtain data, such as local data or synchronized data obtained via the synchronized network, from the network component. In response to data request 746, SNI manager 710 can send the requested data to SNI thread 730 via data response message 748. Upon reception of the requested data, SNI thread 730 can then process the requested data; e.g., a packet from the synchronized network.

Figure 8:
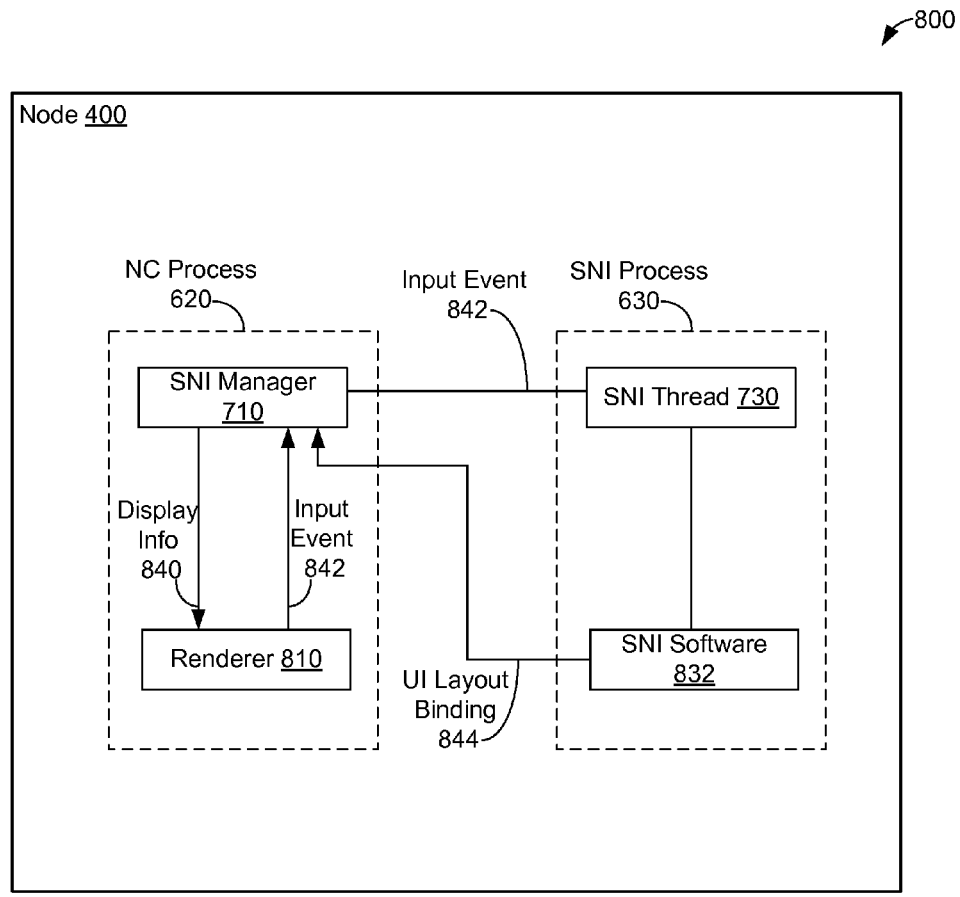
FIG. 8 depicts a scenario for providing a user interface to a synchronized network using SNIs, in accordance with an example embodiment.

FIG. 8 depicts scenario 800 for providing a user interface to a synchronized network using SNIs, in accordance with an example embodiment. FIG. 8 shows network component process 620 with SNI manager 710 and renderer 810 and SNI process 630 with SNI thread 730 and SNI software 832. Renderer 810 can manage the user interface to the synchronized network. In particular, renderer 810 can manage the graphics system and data and process input events that can change graphics data, such as a scene graph. Once renderer 810 has processed an input event, renderer 810 can provide the event to SNI manager 710.

SNI manager 710 can manage a status for a display associated with node 400; e.g., a state of objects displayed on the display, where the display can be a monitor, screen, touch screen or other device configured to show images, graphical elements, and/or data. During scenario 800, SNI manager 710 can provide display information 840 to renderer 810 with layouts of all elements on the display and information about displayed responses to detected user interface actions, such as gestures detected by a touch screen acting as the display.

Some input events can be processed directly (solely) by renderer 810, while other input events can be processed by both SNI manager 710 and renderer 810. In scenario 800, input event 842 is not processed directly by the renderer 810. Then, renderer 810 can provide input event 842 to SNI manager 710; e.g. using a call back mechanism. Upon reception of input event 842, SNI manager 710 can process the event. The call back mechanism can include a callback to SNI manager 710 to indicate that a gesture or other input event has completed; e.g., an indication that a swipe up gesture has completed that makes a UI layout visible.

Some events can involve processing by renderer 810, SNI manager 710, and SNI software 832. In scenario 800, input event 842 is processed by renderer 810, SNI manager 710, and SNI software 832. After processing input event 842, SNI manager 710 can provide input event 842 to SNI thread 730 of SNI process 630 for SNI processing. In scenario 800, SNI thread 730 and SNI software 832 process input event 842 by creating a layout and binding a layout via UI layout binding 844 to renderer 810. Once bound, renderer 810 can render, or draw, graphical objects as needed to display the laid-out UI layout bound via UI layout binding 844.

In some embodiments, SNIs can be embedded software within a software application executing on node 400. Then, to install an SNI, a software application can be installed that includes the SNI. In some scenarios, once the SNI is installed on one node, the SNI can be delivered to the other nodes via the synchronous network.

In particular embodiments, the software application and/or SNI can be provided to a node using a software wrapper that provides information about software being provided and instructions related to installing the software. Then, if only an SNI is to be installed, the SNI can be packaged with wrapper instructions to only install the SNI and/or undo installation of the application after both the application and SNI are installed, with the net effect of installing the SNI without installing the application.

In other embodiments, an SNI server can synchronize data and SNIs, and so install SNIs on nodes of a synchronous network based on updates to the SNI and/or data being communicated in the synchronous network. In still other embodiments, a software application can communicate with the SNI server to request SNI installation.

In even other embodiments, a software application can reference SNIs whose locations are specified terms of network addresses; e.g., a cloud SNI resource. For example, an SNI can be specified in terms of a network address, a resource locator, or some other addressing mechanism to obtain software via a network. Then, upon learning about a referenced SNI, SNI manager 710, or other software such as an SNI installer, can determine if the referenced SNI is already installed on node 400 and, if not installed, obtain the SNI from the cloud SNI resource and install the obtained SNI.

In some cases, a list of SNIs installed within the synchronous network can be maintained. The list can be associated with a user, user account, synchronous network name, or some other identifier. Then, to determine if an SNI S is already installed, the list of SNIs can be searched for an SNI S. If S is found in the list of SNIs, then S can be determined to be installed; otherwise, S can be determined not to be installed.

An SNI can be installed upon receipt of a triggering input to node 400. For example, a reference to an SNI can be a triggering input; e.g., the SNI is referenced by an installed software application. Another triggering event can be a request to install the SNI. Yet another triggering event can be a location-based trigger; e.g., determining node 400 is near a ski resort can trigger an SNI for processing snowfall-related data or wind chill factors. Another example can be reception of a new list of SNIs listing at least one currently-uninstalled SNI; e.g., as part of software and/or hardware installation with a list of referenced SNIs; by addition of a new user of synchronous network with a new list of SNIs.

Packets in the synchronized network can be associated with SNIs, and so reception of a packet can be a triggering input. For example, packets storing weather data can be identified as weather-related packets. Then, upon reception of a weather-related packet, node 400 can determine whether there are one or more SNIs associated with reception and/or processing of the weather-related packet. If there are one or more SNIs associated with reception and/or processing of the weather-related packet, node 400 can then determine if some or all of the associated SNIs are uninstalled. If there are uninstalled associated SNIs, then the associated SNIs can be obtained and installed on node 400.

Determining to send a packet can be a triggering input. Continuing the example above, if there are SNI(s) related to sending a weather-related packet, an input related to sending a weather-related packet, node 400 can determine whether there are one or more SNIs associated with sending and/or processing of the weather-related packet. If there are one or more SNIs associated with sending and/or processing of the weather-related packet, node 400 can then determine if some or all of the associated SNIs are uninstalled. If there are uninstalled associated SNIs, then the associated SNIs can be obtained and installed on node 400.

Data obtained from sensors can act as a triggering input. For example, a location determined by a location sensor associated with node 400 can act as a location-based trigger. As another example, receiving data from a temperature sensor can trigger sending of a weather-related packet, and so act as a triggering input as discussed above. A further example can include a new sensor being associated with node 400. Then, when the new sensor provides data to node 400 and/or when the new sensor is installed, the received data from the sensor and/or data related to sensor installation can act as a triggering input to locate and possible obtain and install an SNI.

Many other examples of triggering inputs are possible as well; e.g., an input to utilize an application of the node, an input from a user interface associated with the node, an input from a network other than the synchronized network, and an input related to a status of the node.

For example, input from a network other than the synchronized network can include news, financial information, social-networking information, sports-related information, medical/health-related information, an input related to a game or games, a notification of an event, communication from one or more entities not associated with the synchronized network, and/or other types of input. As a specific example, suppose the input from the network other than the synchronized network is a Short Messaging Service (SMS) and/or Multi-media Messaging Service (MMS) message. Then, upon reception of the SMS and/or MMS message, node 400 can determine whether there are one or more SNIs associated with sending, receiving and/or processing of SMS and/or MMS messages. If there are one or more SNIs associated with SMS and/or MMS messages, node 400 can then determine if some or all of the associated SNIs are uninstalled. If there are uninstalled associated SNIs, then the associated SNIs can be obtained and installed on node 400.

As another specific example, suppose node 400 wants to communicate with the network other than the synchronized network by sending an SMS (or MMS) message. Then, node 400 can determine whether there are one or more SNIs associated with sending, receiving, and/or processing of SMS (or MMS) messages. If there are one or more SNIs associated with SMS (or MMS) messages, node 400 can then determine if some or all of the associated SNIs are uninstalled. If there are uninstalled associated SNIs, then the associated SNIs can be obtained and installed on node 400. Once the associated SNIs are all installed, node 400 can send the SMS (or MMS) message. Many other examples are possible as well.

In some cases, SNI can have private data that is to be protected from unauthorized access. Then, an SNI or SNI can be associated with a security certificate to establish a security domain. For example, an SNI can be accompanied by a security certificate, and only applications that share the same security certificate with the provided SNI can access packets of those SNIs.

Figure 9:
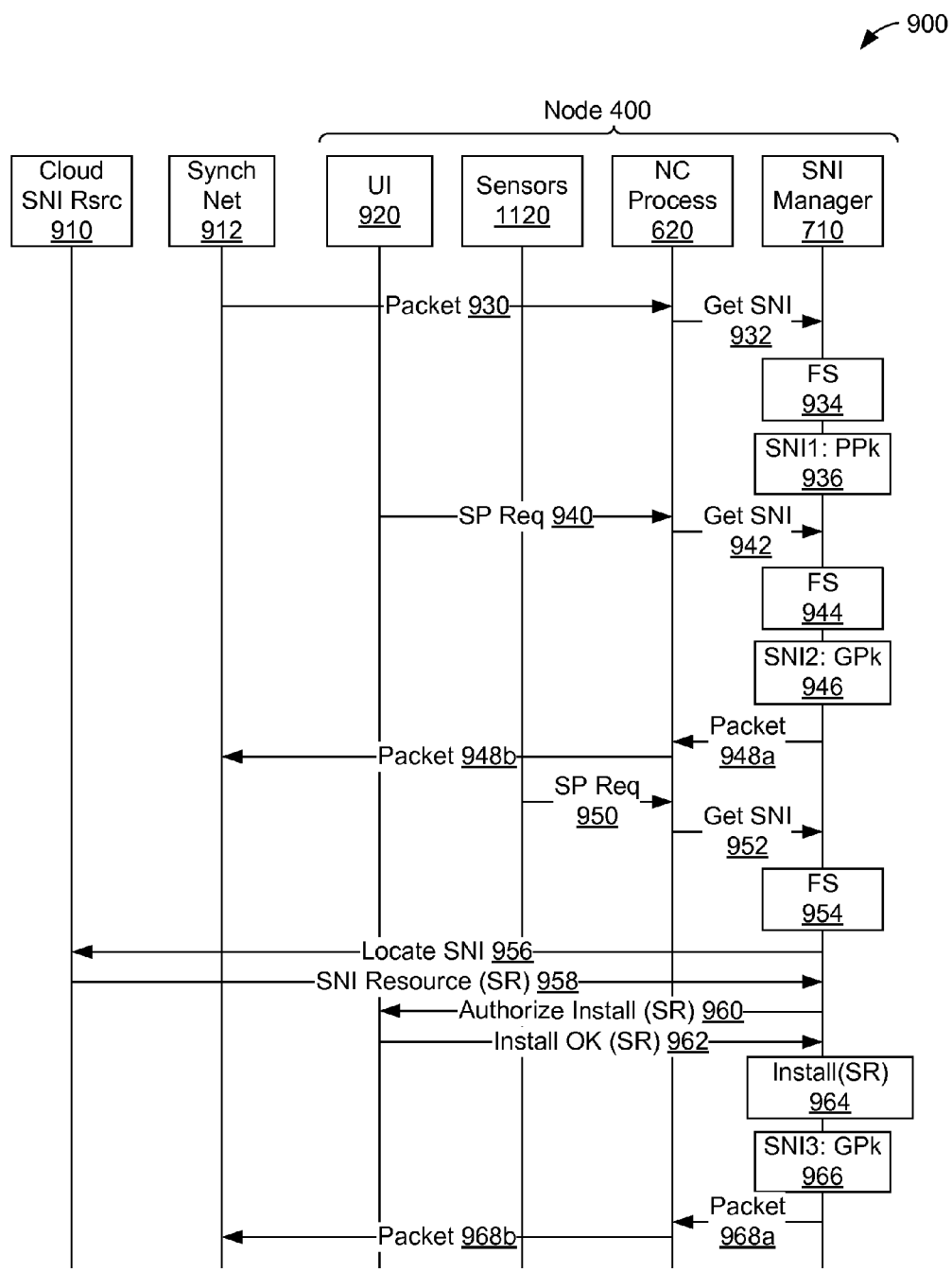
FIG. 9 is a scenario for processing packets using SNIs, in accordance with an example embodiment.

FIG. 9 depicts scenario 900 for processing packets using SNIs, in accordance with an example embodiment. Scenario 900 involves node 400 with a user interface (UI) 920, sensors 1120, network component process 620, and SNI manager 710. Node 400 is connected to cloud SNI resource 910 and synchronized network 912. In scenario 900, node 400 acts as a node of synchronized network 912.

Scenario 900 can begin by node 400 receiving packet 930 from synchronized network 912. Packet 930 can be received by network component process 620, which can then determine an SNI is associated with packet 930. Network component process 620 can request an SNI for processing packet 930 using get SNI message 932. SNI manager 710 can receive get SNI message 932 and attempt to find SNI (FS) 934. In scenario 900, SNI manager finds an SNI, SNI1, to process packet 930. SNI1 can process packet (PPk) 936.

Scenario 900 can continue with an input received at user interface 920 related to send a packet. In response, send packet message 940 can be sent from user interface 920 to network component process 620. Network component process 620 can then send get SNI message 942 to request an SNI to generate a packet as requested by send packet message 940. SNI manager 710 can receive get SNI message 942 and attempt 944 to find an SNI. In scenario 900, SNI manager 710 finds an SNI, SNI2, to generate the requested packet associated with send packet message 940. SNI2 can generate a packet (GPk) 946. The generated packet is shown in FIG. 9 as packet 948a, which is sent from SNI manager 710 to network component process 620. Network component process 620 may modify packet 948a; e.g., format packet 948a for transmission by synchronized network 912 and/or change network addresses specified in packet 948a. Packet 948a, with or without modification, can be sent as packet 948b from network component process 620 to synchronized network 912. In scenario 900, data in packet 948b includes synchronized data. Then, after receiving packet 948b, synchronized network 912 can synchronize the synchronized data in packet 948b with the other nodes of synchronized network 912.

Scenario 900 can continue with sensors 1120 generating data to be synchronized throughout synchronized network 912. Sensors 1120 can send the data via send packet request 950 to network component process 620. Network component process 620 can then send get SNI message 952 to request an SNI to generate a packet as requested by send packet message 950. SNI manager 710 can receive get SNI message 952 and attempt 954 to find an SNI.

In scenario 900, SNI manager 710 fails to find a local SNI to generate the requested packet associated with send packet message 950. Then, SNI manager 710 can attempt to locate a remote SNI to generate the requested packet using cloud SNI resource 910. To locate the SNI, SNI manager 710 can send locate SNI message 956 to cloud SNI resource 910. Upon reception of locate SNI message 956, cloud SNI resource 910 can find the requested SNI and send SNI resource message 958 that includes SNI resource SR. SNI resource SR can include information for obtaining and installing the requested SNI; e.g., a software package that includes software and instructions for installing the requested SNI.

In some scenarios, authorization to install an SNI must be granted before the SNI can be installed on node 400. To obtain this authorization, SNI manager 710 can request authorization via authorize install message 960 sent to user interface 920. User interface 920 can subsequently generate a dialog or other user interface element(s) to request authorization to install the SNI in SNI resource SR. In scenario 900, authorization to install the SNI is granted. The authorization is communicated from user interface 920 to SNI manager 630 via install OK message 962. In other scenarios not shown in FIG. 9, SNI resource SR can be installed without authorization; e.g., prior authorization had been granted to SNI manager 710 or settings data can indicate that authorization is not required to install SNIs.

Upon reception of the SNI in SNI resource SR, SNI manager 710 can install 964 the SNI, and the installed SNI, SNI3, can generate 966 the packet requested via send packet request 950 as packet 968a. In scenario 900, packet 968a includes the synchronized data associated with send packet request 950. Packet 968a can be sent from SNI manager 710 to network component process 620. Network component process 620 may modify packet 968a; e.g., format packet 968a for transmission by synchronized network 912 and/or change network addresses specified in packet 948a. Packet 968a, with or without modification, can be sent as packet 968b from network component process 620 to synchronized network 912. Then, after receiving packet 968b, synchronized network 912 can synchronize the synchronized data in packet 968b with the other nodes of synchronized network 912. After synchronizing the data in packet 968b, scenario 900 can be completed.

Example Data Network

Figure 10:
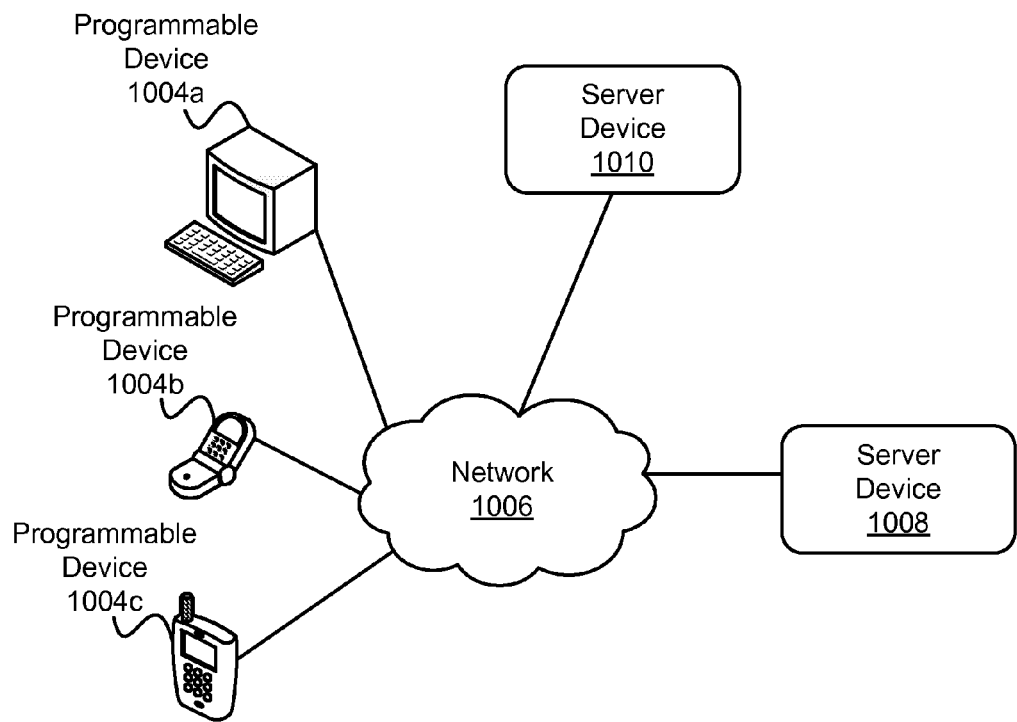
FIG. 10 depicts a distributed computing architecture, in accordance with an example embodiment.

FIG. 10 shows server devices 1008, 1010 configured to communicate, via network 1006, with programmable devices 1004a, 1004b, and 1004c. Network 1006 may correspond to a local area network (LAN), a wide area network (WAN), a corporate intranet, the public Internet, or any other type of network configured to provide a communications path between networked computing devices. The network 1006 may also correspond to a combination of one or more LANs, WANs, corporate intranets, and/or the public Internet.

Although FIG. 10 only shows three programmable devices, distributed application architectures may serve tens, hundreds, or thousands of programmable devices. Moreover, programmable devices 1004a, 1004b, and 1004c (or any additional programmable devices) may be any sort of computing device, such as an ordinary laptop computer, desktop computer, network terminal, wireless communication device (e.g., a cell phone or smart phone), and so on. In some embodiments, programmable devices 1004a, 1004b, and 1004c may be dedicated to the design and use of software applications. In other embodiments, programmable devices 1004a, 1004b, and 1004c may be general purpose computers that are configured to perform a number of tasks and need not be dedicated to software development tools. In still other embodiments, programmable devices 1004a, 1004b, and/or 1004c can be configured to perform some or all of the herein-described functionality of a computing device.

Server devices 1008, 1010 can be configured to perform one or more services, as requested by programmable devices 1004a, 1004b, and/or 1004c. For example, server device 1008 and/or 1010 can provide content to programmable devices 1004a-1004c. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 1008 and/or 1010 can provide programmable devices 1004a-1004c with access to software for database, search, computation, graphical, audio, video, World Wide Web/Internet utilization, and/or other functions. Many other examples of server devices are possible as well.

Computing Device Architecture

Figure 11A:
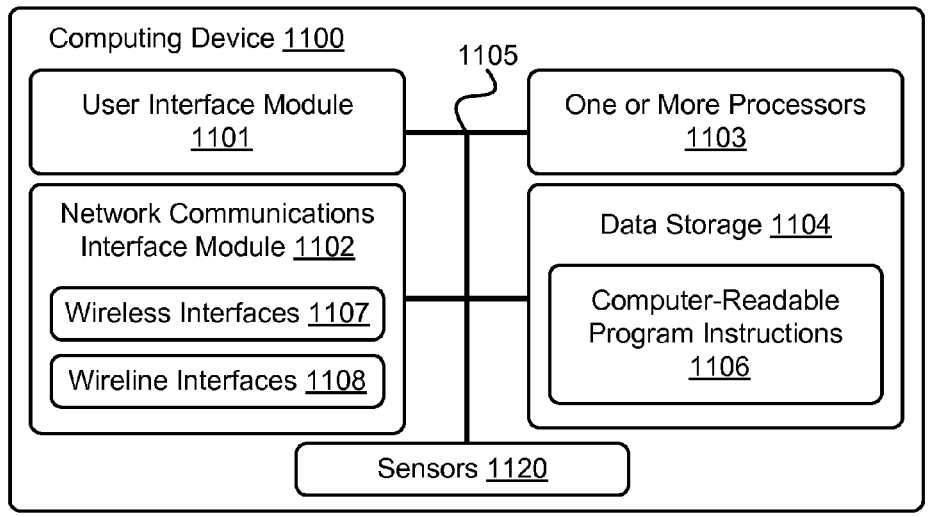
FIG. 11A is a block diagram of a computing device, in accordance with an example embodiment.

FIG. 11A is a block diagram of a computing device (e.g., system) in accordance with an example embodiment. In particular, computing device 1100 shown in FIG. 11A can be configured to perform part or all of methods 100, 200, and/or 300 and/or some or all of the herein-described functionality of node 400, network cloud 510, WiFi/Cellular Watches 520, 550, smartphone 530, WiFi/Cellular Vehicle 540, a cloud SNI resource, e.g., cloud SNI resource 910, and/or a synchronized network; e.g., synchronized network 912. In some embodiments, computing device 1100 can be portable, and in specific embodiments, computing device 1100 can be wearable; e.g., configured to be worn by a person, such as a computing device configured for use as eyeglasses or a wristwatch. Many other possible portable and/or wearable computing devices are possible as well.

Computing device 1100 may include a user interface module 1101, a network-communication interface module 1102, one or more processors 1103, data storage 1104, and sensors 1120, all of which may be linked together via a system bus, network, or other connection mechanism 1105.

User interface module 1101 can be operable to send data to and/or receive data from external user input/output devices. For example, user interface module 1101 can be configured to send and/or receive data to and/or from user input devices such as a keyboard, a keypad, a touch screen, a computer mouse, a track ball, a joystick, a camera, a voice recognition module, and/or other similar devices. User interface module 1101 can also be configured to provide output to user display devices, such as one or more cathode ray tubes (CRT), liquid crystal displays (LCDs), light emitting diodes (LEDs), displays using digital light processing (DLP) technology, printers, light bulbs, and/or other similar devices, either now known or later developed. User interface module 1101 can also be configured to generate audible output(s), such as a speaker, speaker jack, audio output port, audio output device, earphones, and/or other similar devices.

Network-communications interface module 1102 can include one or more wireless interfaces 1107 and/or one or more wireline interfaces 1108 that are configurable to communicate via a network, such as network 606 shown in FIG. 10. Wireless interfaces 1107 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 1108 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 1102 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and DSA. Other cryptographic protocols and/or algorithms can be used as well or in addition to those listed herein to secure (and then decrypt/decode) communications.

Processors 1103 can include one or more general purpose processors and/or one or more special purpose processors (e.g., digital signal processors, application specific integrated circuits, etc.). Processors 1103 can be configured to execute computer-readable program instructions 1106a that are contained in the data storage 1104 and/or other instructions as described herein.

Data storage 1104 can include one or more computer-readable storage media that can be read and/or accessed by at least one of processors 1103. For example, data storage 1104 can provide memory for the herein-described application spaces and non-application spaces; i.e., part or all of data storage 1104 can be divided into application space(s) and non-application space(s). The one or more computer-readable storage media can include volatile and/or non-volatile storage components, such as optical, magnetic, organic or other memory or disc storage, which can be integrated in whole or in part with at least one of processors 1103. In some embodiments, data storage 1104 can be implemented using a single physical device (e.g., one optical, magnetic, organic or other memory or disc storage unit), while in other embodiments, data storage 1104 can be implemented using two or more physical devices.

Data storage 1104 can include computer-readable program instructions 1106. In some embodiments, data storage 1104 can additionally include storage required to perform at least part of the herein-described methods and techniques and/or at least part of the functionality of the herein-described devices and networks.

Sensors 1120 can be configured to measure conditions in an environment for computing device 1100 and provide data about that environment. The data can include, but is not limited to: data about computing device 1100, location data about computing device 1100, velocity (speed, direction) data about computing device 1100, acceleration data about computing device 1100, and other data about the environment for computing device 1100. Sensors 1120 can include, but are not limited to, power sensor(s), battery sensor(s), movement sensor(s), GPS sensor(s), location sensors(s), gyroscope(s), accelerometer(s), magnetometer(s), camera (s), light sensor(s), infrared sensor(s), and microphone(s).

Cloud-Based Servers

Figure 11B:
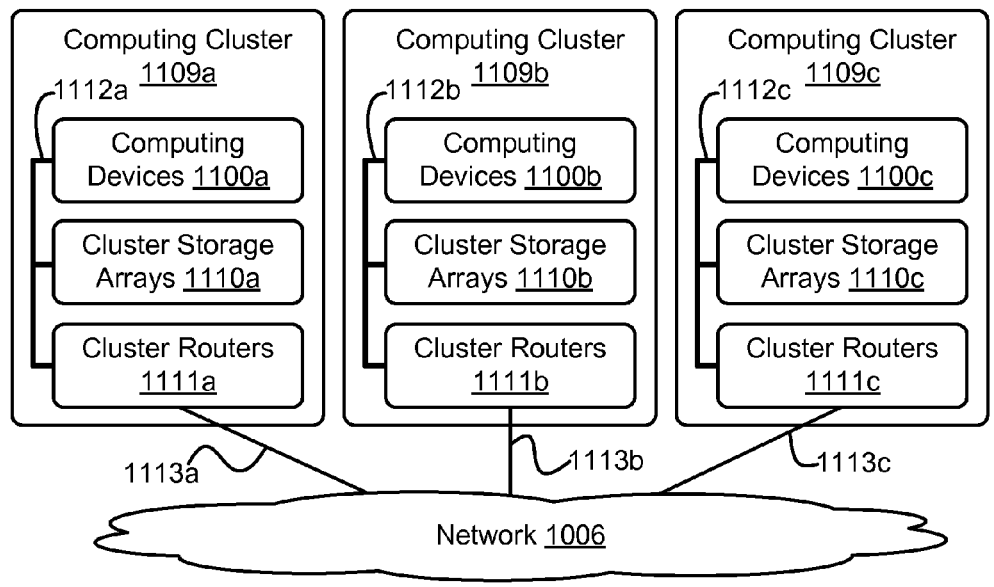
FIG. 11B depicts a cloud-based server system, in accordance with an example embodiment.

FIG. 11B depicts a network 1006 of computing clusters 1109a, 1109b, 1109c arranged as a cloud-based server system in accordance with an example embodiment. Server devices 1008 and/or 1010 can be cloud-based devices that store program logic and/or data of cloud-based applications and/or services. In some embodiments, server devices 1008 and/or 1010 can be a single computing device residing in a single computing center. In other embodiments, server device 1008 and/or 1010 can include multiple computing devices in a single computing center, or even multiple computing devices located in multiple computing centers located in diverse geographic locations. For example, FIG. 10 depicts each of server devices 1008 and 1010 residing in different physical locations.

In some embodiments, data and services at server devices 1008 and/or 1010 can be encoded as computer readable information stored in non-transitory, tangible computer readable media (or computer readable storage media) and accessible by programmable devices 1004a, 1004b, and 1004c, and/or other computing devices. In some embodiments, data at server device 1008 and/or 1010 can be stored on a single disk drive or other tangible storage media, or can be implemented on multiple disk drives or other tangible storage media located at one or more diverse geographic locations.

FIG. 11B depicts a cloud-based server system in accordance with an example embodiment. In FIG. 11B, the functions of server device 1008 and/or 1010 can be distributed among three computing clusters 1109a, 1109b, and 1109c. Computing cluster 1109a can include one or more computing devices 1100a, cluster storage arrays 1110a, and cluster routers 1111a connected by a local cluster network 1112a. Similarly, computing cluster 1109b can include one or more computing devices 1100b, cluster storage arrays 1110b, and cluster routers 1111b connected by a local cluster network 1112b. Likewise, computing cluster 1109c can include one or more computing devices 1100c, cluster storage arrays 1110c, and cluster routers 1111c connected by a local cluster network 1112c.

In some embodiments, each of the computing clusters 1109a, 1109b, and 1109c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1109a, for example, computing devices 1100a can be configured to perform various computing tasks of electronic communications server 1112. In one embodiment, the various functionalities of electronic communications server 1112 can be distributed among one or more of computing devices 1100a, 1100b, and 1100c. Computing devices 1100b and 1100c in computing clusters 1109b and 1109c can be configured similarly to computing devices 1100a in computing cluster 1109a. On the other hand, in some embodiments, computing devices 1100a, 1100b, and 1100c can be configured to perform different functions.

In some embodiments, computing tasks and stored data associated with server devices 1008 and/or 1010 can be distributed across computing devices 1100a, 1100b, and 1100c based at least in part on the processing requirements of server devices 1008 and/or 1010, the processing capabilities of computing devices 1100a, 1100b, and 1100c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 1110a, 1110b, and 1110c of the computing clusters 1109a, 1109b, and 1109c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 1008 and/or 1010 can be distributed across computing devices 1100a, 1100b, and 1100c of computing clusters 1109a, 1109b, and 1109c, various active portions and/or backup portions of these components can be distributed across cluster storage arrays 1110a, 1110b, and 1110c. For example, some cluster storage arrays can be configured to store the data of server device 1008, while other cluster storage arrays can store data of server device 1010. Additionally, some cluster storage arrays can be configured to store backup versions of data stored in other cluster storage arrays.

The cluster routers 1111a, 1111b, and 1111c in computing clusters 1109a, 1109b, and 1109c can include networking equipment configured to provide internal and external communications for the computing clusters. For example, the cluster routers 1111a in computing cluster 1109a can include one or more internet switching and routing devices configured to provide (i) local area network communications between the computing devices 1100a and the cluster storage arrays 1101a via the local cluster network 1112a, and (ii) wide area network communications between the computing cluster 1109a and the computing clusters 1109b and 1109c via the wide area network connection 1113a to network 1006. Cluster routers 1111b and 1111c can include network equipment similar to the cluster routers 1111a, and cluster routers 1111b and 1111c can perform similar networking functions for computing clusters 1109b and 1109b that cluster routers 1111a perform for computing cluster 1109a.

In some embodiments, the configuration of the cluster routers 1111a, 1111b, and 1111c can be based at least in part on the data communication requirements of the computing devices and cluster storage arrays, the data communications capabilities of the network equipment in the cluster routers 1111a, 1111b, and 1111c, the latency and throughput of local networks 1112a, 1112b, 1112c, the latency, throughput, and cost of wide area network links 1113a, 1113b, and 1113c, and/or other factors that can contribute to the cost, speed, fault-tolerance, resiliency, efficiency and/or other design goals of the moderation system architecture.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

It should be understood that other embodiments can include more or less of each element shown in a given figure. Further, some of the illustrated elements can be combined or omitted. Yet further, an example embodiment can include elements that are not illustrated in the figures.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

Moreover, a block that represents one or more information transmissions may correspond to information transmissions between software and/or hardware modules in the same physical device. However, other information transmissions may be between software modules and/or hardware modules in different physical devices.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, and/or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A method, comprising:
   receiving a first packet at a node of a synchronized network, wherein the synchronized network comprises the node and additional nodes, wherein the node comprises a first SNI list referring to the plurality of SNIs installed on the node, and wherein the node is configured to communicate at least with the additional nodes of the synchronized network;
   determining whether a software network interface (SNI) of a plurality of SNIs is installed on the node and is associated with the first packet based on the first SNI list, wherein the SNI comprises software configured to execute on the node, wherein the plurality of SNIs is associated with the node and the additional nodes, and wherein determining whether the SNI of the plurality of SNIs is on the node comprises selecting the SNI from the plurality of SNIs based on the first packet; and
   after determining that the SNI is installed on the node and is associated with the first packet, providing a view of data in the synchronized network using the node by at least:
      determining a user interface (UI) layout associated with the SNI, the UI layout comprising one or more controls to control a device associated with a sending node that sent the first packet;
      generating the view of data in the synchronized network based on the UI layout and on the information of the packet using the SNI, wherein the view of data comprises a prioritized list of summary UI layouts created by the plurality of SNIs, and wherein the SNI selects a priority for ordering the UI layout in the prioritized list of summary UI layouts; and
      providing the view of data in the synchronized network;
   receiving a second list of SNIs that includes a reference to a second SNI at the node, the second SNI comprising second software,
   after receiving the second list of SNIs, determining whether the second SNI is installed on the node by determining that the second SNI is referred to in the second list of SNIs and that the second SNI is not referred to in the first list of SNIs;
   after determining that the second SNI is not installed on the node, installing at least the second software of the second SNI on the node; and
   after the second software of the second SNI is installed on the node, executing the second software of the second SNI on the node.

2. The method of claim 1, wherein selecting the SNI from the plurality of SNIs based on information in the first packet comprises:
   selecting the SNI from the plurality of SNIs based on the sending node.

3. The method of claim 1, further comprising:
   generating a second packet at the node, the second packet including second information; and
   sending the second packet to each node of the additional nodes.

4. The method of claim 1, wherein the additional nodes comprise a second node that differs from the node, and wherein the SNI is configured to send a node-to-node message to the second node via the synchronized network.

5. The method of claim 1, further comprising:
   receiving a third packet at the node, wherein the node is a particular device;
   determining whether the third packet is for utilization by the particular device; and
   after determining that the third packet is not for utilization by the particular device, discarding the third packet.

6. The method of claim 1, wherein determining whether the SNI is installed on the node and is associated with the first packet comprises:
   receiving an input related to an application configured to execute on the node;
   referring to the SNI during execution of the application to process the packet, wherein the application is distinct from the SNI; and
   executing the SNI to process the first packet.

7. The method of claim 1, wherein selecting the SNI from the plurality of SNIs comprises:
   selecting the SNI based on receiving an input from a user interface for the SNI.

8. The method of claim 1, further comprising:
   providing a task view for performing a specific task utilizing a task-location UI layout of the plurality of layouts, wherein the task view of data differs from the view of data in the synchronized network.

9. A node, configured to communicate with a synchronized network, the node comprising:
   a processor; and
   a non-transitory computer-readable medium configured to store at least program instructions, when the program instructions are executed by the processor, the program instructions cause the node to carry out functions comprising:
      receiving a first packet, wherein the synchronized network comprises the node and additional nodes, wherein the node comprises a first SNI list referring to the plurality of SNIs installed on the node, and wherein the node is configured to communicate at least with the additional nodes of the synchronized network;
      determining whether a software network interface (SNI) of a plurality of SNIs is installed on the node and is associated with the first packet based on the first SNI list, wherein the SNI comprises software configured to be executed by the processor, wherein the plurality of SNIs is associated with the node and the additional nodes, and wherein determining whether the SNI of the plurality of SNIs is on the node comprises selecting the SNI from the plurality of SNIs based on the first packet; and
      after determining that the SNI is installed on the node and is associated with the first packet, providing a view of data in the synchronized network by at least:
         determining a user interface (UI) layout associated with the SNI, the UI layout comprising one or more controls to control a device associated with a sending node that sent the first packet;
         generating the view of data based on the UI layout and on the information of the packet using the SNI, wherein the view of data comprises a prioritized list of summary UI layouts created by the plurality of SNIs, and wherein the SNI selects a priority for ordering the UI layout in the prioritized list of summary UI layouts; and providing the view of data;

receiving a second list of SNIs that includes a reference to a second SNI that comprises second software;

after receiving the second list of SNIs, determining whether the second SNI is installed on the node by determining that the second SNI is referred to in the second list of SNIs and that the second SNI is not referred to in the first list of SNIs;

after determining that the second SNI is not installed on the node, installing at least the second software of the second SNI on the node; and after the second software of the second SNI is installed on the node, executing the second software of the second SNI.

10. The node of claim 9, wherein selecting the SNI from the plurality of SNIs based on information in the first packet comprises:

selecting the SNI from the plurality of SNIs based on the sending node.

11. The node of claim 9, wherein the functions further comprise:

generating a second packet, the second packet including second information; and sending the second packet to each node of the additional nodes.

12. The node of claim 9, wherein the additional nodes comprise a second node that differs from the node, and wherein the SNI is configured to send a node-to-node message to the second node via the synchronized network.

13. The node of claim 9, wherein the functions further comprise:

receiving a third packet at the node, wherein the node is a particular device;

determining whether the third packet is for utilization by the particular device; and after determining that the third packet is not for utilization by the particular device, discarding the third packet.

14. The node of claim 9, wherein determining whether the SNI is installed on the node and is associated with the first packet comprises:

receiving an input related to an application configured to execute on the node;

referring to the SNI during execution of the application to process the packet, wherein the application is distinct from the SNI; and executing the SNI to process the first packet.

15. The node of claim 9, wherein selecting the SNI from the plurality of SNIs comprises:

selecting the SNI based on an input from a user interface for the SNI.

16. The node of claim 9, wherein the functions further comprise:

providing a task view of data for performing a specific task utilizing a task-location UI layout of the plurality of layouts, wherein the task view of data differs from the prioritized list of summary UI layouts.

17. A non-transitory computer-readable medium configured to store program instructions that, when executed by a processor of a node configured to communicate with a synchronized network, cause the node to carry out functions comprising:

receiving a first packet, wherein the synchronized network comprises the node and additional nodes, wherein the node comprises a first SNI list referring to the plurality of SNIs installed on the node, and wherein the node is configured to communicate at least with the additional nodes of the synchronized network;

determining whether a software network interface (SNI) of a plurality of SNIs is installed on the node and is associated with the first packet based on the first SNI list, wherein the SNI comprises software configured to execute on the node, wherein the plurality of SNIs is associated with the node and the additional nodes, and wherein determining whether the SNI of the plurality of SNIs is on the node comprises selecting the SNI from the plurality of SNIs based on the first packet; and after determining that the SNI is installed on the node and is associated with the first packet, providing a view of data in the synchronized network by at least:

determining a user interface (UI) layout associated with the SNI, the UI layout comprising one or more controls to control a device associated with a sending node that sent the first packet;

generating the view of data based on the UI layout and on the information of the packet using the SNI, wherein the view of data comprises a prioritized list of summary UI layouts created by the plurality of SNIs, and wherein the SNI selects a priority for ordering the UI layout in the prioritized list of summary UI layouts; and providing the view of data;

receiving a second list of SNIs that includes a reference to a second SNI that comprises second software;

after receiving the second list of SNIs, determining whether the second SNI is installed on the node by determining that the second SNI is referred to in the second list of SNIs and that the second SNI is not referred to in the first list of SNIs;

after determining that the second SNI is not installed on the node, installing at least the second software of the second SNI on the node; and after the second software of the second SNI is installed on the node, executing the second software of the second SNI.

18. The non-transitory computer-readable medium of claim 17, wherein selecting the SNI from the plurality of SNIs based on information in the first packet comprises:

selecting the SNI from the plurality of SNIs based on the sending node.

19. The non-transitory computer-readable medium of claim 17, wherein selecting the SNI from the plurality of SNIs comprises:

selecting the SNI based on an input from a user interface for the SNI.

20. The non-transitory computer-readable medium of claim 17, wherein the functions further comprise:

receiving a third packet at the node, wherein the node is a particular device;

determining whether the third packet is for utilization by the particular device; and after determining that the third packet is not for utilization by the particular device, discarding the third packet.

* * * * *